UNITED STATES PATENT OFFICE.

HENRY SPENCER BLACKMORE, OF MOUNT VERNON, NEW YORK.

PROCESS OF OBTAINING WATER-SOLUBLE ALKALI-METAL COMPOUNDS FROM WATER-INSOLUBLE SUBSTANCES.

1,355,381.

Specification of Letters Patent.  Patented Oct. 12, 1920.

No Drawing.  Application filed March 19, 1917.  Serial No. 155,895.

*To all whom it may concern:*

Be it known that I, HENRY SPENCER BLACKMORE, a citizen of the United States, residing at Mount Vernon, in the county of Westchester and State of New York, have invented certain new and useful Improvements in Processes of Obtaining Water-Soluble Alkali-Metal Compounds from Water-Insoluble Substances, of which the following is a specification.

This invention relates to a process for transforming substantially water-insoluble alkali or other metal compounds or compositions into water-soluble compounds and securing the same therefrom, and has for one of its objects the transformation, making, and separating of water-soluble alkali-metal compounds or salts from their substantially water-insoluble compounds or minerals, such as their silicon combinations, of compound, composite, or complex silicate or other nature, etc., or the obtaining of potassium compounds or salts, such as potassium carbonate, from orthoclase (potash feldspar), lucite, muscovite (potash mica), glauconite (green sand), or like siliceous substances containing the same; and it comprises subjecting the water-insoluble mineral or alkali-metal compound, such as silicate of simple, compound, or composite nature, a new compound of which alkali-metal is desired, for example potash feldspar (orthoclase), to the action of a neutral or alkaline silicofluorid such as aluminium silicofluorid, sodium silicofluorid, or ammonium silicofluorid or such silicofluorid and water, and preferably augmented by super-atmospheric pressure and heat, and separating and recovering the potassium or other products, soluble in hot water, produced, from the residue, by decantation, filtration or other convenient means thereby securing the hot aqueous solution thereof which upon cooling deposits potassium silicofluorid which is only sparingly soluble in cold water, and thereafter separating the potassium silicofluorid from the natant or mother liquor, and subjecting the same to the action of further chemicals or substances to produce other final products desired as hereinafter more particularly described, such as converting the potassium silicofluorid into potassium carbonate or sulfate and ammonium or aluminium silicofluorid by the action of ammonium carbonate or aluminium sulfate as hereinafter more particularly described.

In the prior art great difficulty has been experienced in the conversion and separation of water soluble alkali-metal compositions from water insoluble silicious substances or minerals by reason of the fact that the silicious alkali-metal composition was only partially or imperfectly converted or transformed, and its solution and separation from the residue was attended with great difficulty, it being tenaciously retained therein and prevented from readily entering into solution. Another difficulty experienced was that the silicious hydrates formed had a tendency to gelatinize the water present and further retard the securing of the water soluble compound desired; and another difficulty resided in the fact that the residue was usually contaminated with some ingredient employed in the liberation of the potassium from its silicious compound thus rendering the residue valueless as a commercial commodity, and furthermore great loss was occasioned through the employement of expensive chemicals for the purpose of transformation which were not recovered in an available form for re-use and the heat required and lost through the necessity of the evaporation of large quantity of water to secure small percentages of alkali metal salts, together with loss by corrosion and wear and tear on the apparatus employed from the action of chemicals and heat made the recovery of water soluble potassium or alkali-metal compounds in the prior art prohibitive by reason of expense and time required from a commercial standpoint, all of which difficulties are sought to be overcome and eliminated in the present process.

As an illustration of the process or manner in which the invention is carried out three examples will be given, all of which will be directed to the recovery of water soluble potassium compounds from potash feldspar or orthoclase, although it will be understood that the process may be employed for the converting, separating and securing of other alkali-metal compounds, such as sodium, lithium, etc., from their respective containing minerals, without departing from the spirit of the invention.

One of the important features in connection with the present invention resides in the fact that the neutral or alkaline silicofluorid employed is either inert in excess to the ingredients other than that desired to be transformed and separated, such as potassium compound from feldspar, or is employed only in proportion to selectively convert and transform the alkali metal compound desired. For instance in the examples hereafter enumerated, it will be noted that aluminium potassium silicate, or potassium feldspar (orthoclase) when acted upon in a heated condition under pressure by an aqueous solution of aluminium silicofluorid, only the insoluble potassium silicate is converted and the potassium silicofluorid formed dissolves in the hot water present and separates from solution upon cooling from any excess of solution of aluminium silicofluorid which may be present and which is inert to the aluminium silicate or kaolin residue, from which the hot solutions have been parted before cooling. If sodium silicofluorid is employed, instead of aluminium silicofluorid, in its hot solution, it reacts only with the potassium silicate and the sodium is transferred to and displaces the potassium from the silicious compound; while if ammonium silicofluorid is employed the potassium silicate is transformed into potassium silicofluorid and the ammonia liberated escapes as such and is liberated at elevated temperatures and can be recovered and re-used through the intermediation of carbondioxid, or carbonic acid in the formation of potassium carbonate ($K_2CO_3$) and ammonium silicofluorid for re-use when caused to react on the potassium silicofluorid recovered from the hot solution separated from the silicious residue upon cooling.

When aluminium silicofluorid is employed as a substance to transform the potassium silicate in potassium feldspar or orthoclase, the orthoclase is preferably pulverized to a fineness which will pass through a 200 mesh sieve; this is then mixed with a solution of aluminium silicofluorid to the consistency of a thin paste, the aluminium silicofluorid being present in about a molecular proportion to convert the insoluble potassium silicate content of the feldspar into potassium silicofluorid which is soluble in hot water. This mixture of feldspar, water and aluminium silicofluorid is then introduced into an autoclave which is provided with a stirrer and after closing the receptacle it is subjected to the action of heat and pressure, a temperature capable of facilitating the conversion being approximately 350° F. while subjected to a pressure incidental to such temperature. The stirring and digesting of the mixture is continued from 3 to 5 hours when it will be found that the greater per cent. of the potassium silicate has been transformed from its water insoluble condition to a hot water soluble potassium silicofluorid. Hot water is then supplied to the mixture to reduce it to a thin fluid condition, it is thoroughly mixed by stirring and the insoluble residue allowed to settle out. The hot solution of potassium silicofluorid is then separated from the residue which is a high grade of kaolin free from iron by decantation, filtration, centrifugal action or other convenient means.

The solution of potassium silicofluorid thus obtained is then allowed to cool down, whereupon being less soluble in cold water it precipitates or crystallizes out and may be readily separated from the supernatant or mother liquor which may contain any excess of aluminium silicofluorid or iron silicofluorid which it may have secured during the operation of the process and which has been thus separated from the kaolin residue.

The reaction which takes place may be illustrated by the following chemical equation:

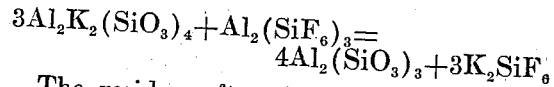

$$3Al_2K_2(SiO_3)_4 + Al_2(SiF_6)_3 = 4Al_2(SiO_3)_3 + 3K_2SiF_6$$

The residue after the separation of the potassium compound and contaminating iron is thoroughly washed and dried and provides a superior quality of kaolin or china clay for employment in the making of crockery or china ware and for other purposes being free as it is, from iron as well as potassium content and has a commercial value even greater than that of the original feldspar together with the cost of making and securing the soluble potassium compound desired.

When sodium silicofluorid is employed instead of aluminium silicofluorid it is dissolved in hot water and mixed with the powdered feldspar and treated in a similar manner as with aluminium silicofluorid in which case the sodium of the silicofluorid displaces the potassium in and from the potassium containing feldspar, forming a hot water soluble potassium silicofluorid and leaving a residue of similar composition to albite or soda feldspar. The hot water soluble potassium silicofluorid is finally obtained in the same manner from its solution on cooling as aforedescribed, as in the case when aluminium silicofluorid was employed as a transforming agent. The sodium left in the residue may be eventually separated in the production of kaolin by treatment with aluminium silicofluorid as above noted, or with ammonium silicofluorid as hereafter set forth.

The reaction which takes place may be illustrated by the following chemical equation:

$$Al_2K_2(SiO_3)_4 + Na_2SiF_6 = Al_2Na_2(SiO_3)_4 + K_2SiF_6$$

When ammonium silicofluorid is employed as a transforming agent for water insoluble alkali metal silicate containing minerals or compounds an aqueous solution thereof is employed in a similar manner to that described in connection with the employment of aluminium silicofluorid or sodium silicofluorid, *supra*, except that as the potassium silicofluorid is formed and dissolved in the associated hot water the ammonia liberated is allowed to escape from the autoclave and is conveyed to a suitable apparatus where together with carbon dioxid and steam it is allowed to act upon potassium silicofluorid which has been produced and secured from this or other processes previously set forth which converts the potassium silicofluorid into ammonium silicofluorid and potassium carbonate which compounds may be separated from each other by reason of their differing solubilities in water, the ammonium silicofluorid being preferably dissolved out with a limited amount of water, leaving the potassium carbonate uncontaminated, or the two compounds may be dissolved in water and separated by fractional crystallization.

The reaction which takes place may be illustrated by the following chemical equation:

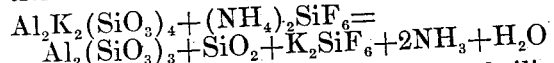
$$Al_2K_2(SiO_3)_4 + (NH_4)_2SiF_6 = Al_2(SiO_3)_3 + SiO_2 + K_2SiF_6 + 2NH_3 + H_2O$$

Instead of converting the alkali metal silicofluorid into carbonate or bicarbonate by the action of ammonia and carbon dioxid the ammonia and carbon dioxid may be combined through the mediation of water producing ammonium carbonate or bicarbonate and such ammonium carbonate or bicarbonate employed as such, or an aqueous solution, to react with the alkali metal silicofluorid preferably in hot aqueous solution.

The supernatant liquor containing the ammonium silicofluorid may be re-used in the continuous performance of the process in separating and converting water insoluble alkali metal containing silicates into water soluble alkali metal compounds over and over again with little loss.

In the case where aluminium silicofluorid is employed as a converting compound, it may be produced by acting upon the potassium silicofluorid product obtained by either or any of the processes enumerated with aluminium sulfate directly or in aqueous solution, in which case potassium sulfate will result, which may be separated in a similar manner from the aluminium silicofluorid as is the potassium carbonate from the ammonium silicofluorid as aforenoted.

While the reactions indicating the processes as afore enumerated may be carried out under ordinary atmospheric pressure in a heated condition, still it is found advantageous to heat and agitate the materials during conversion with water under pressure as set forth, it being obvious that instead of using water in conjunction with the ingredients during conversion the materials may be mixed and heated *per se* in substantially dry form under ordinary or superatmospheric pressure, and the compounds desired separated from the residues by the action of hot water without departing from the spirit of the invention.

In the prior art it has been contemplated to employ hydrofluosilicic acid as such to convert silicates, such as silicate of aluminium and silicate of potassium into double potassium and aluminium fluosilicates and to employ this acid as such as a catalytic agent in the direct conversion of such silicates into sulfates by associating a small quantity of hydrofluosilicic acid with sulfuric acid employed simultaneously in conjunction with the water insoluble silicates and as distinguishing such processes from the present invention it should be noted that no free hydrofluosilicic acid is employed herein but only such neutral or alkaline fluosilicates as will interact with water insoluble alkali metal containing compounds to liberate the alkali metal compound in a form soluble in hot water without the intermediation or employment of hydrofluosilicic acid either as such or in such small proportions in conjunction with other acids, such as sulfuric, as might be defined as a catalytic agent in any manner whatsoever.

The disadvantage in employing hydrofluosilicic acid either as such or associated with others as a catalytic agent resides in the fact that at elevated temperatures the hydrofluosilicic acid is disrupted into hydrofluoric acid, which is of extremely corrosive nature with reference to the apparatus and silicon fluorid which escapes as a gas and finally chokes the flues and conduits with precipitated silica when contacting wet steam or moisture on cooling and further results in the gelatinization of the aqueous ingredients, thus interfering with and retarding the steps of conversion of the mineral and securing of the product, all of which are obviated by the employment of neutral or alkaline fluosilicates as herein set forth.

In the prior art, one of the causes of considerable expense has been the separation and securing of the extremely water soluble potassium compounds or alkali metal compound from the associated water through evaporation of the water from the aqueous solution as a whole down to a point at which the alkali metal compound crystallizes. This expense is considerably reduced in the present process by reason of the fact that the intermediate product of conversion of the alkali metal compound, viz: from the water insoluble silicates to the water soluble carbonates and sulfates is accomplished through the inherent property of the intermediate alkali metal silicofluorid being quite soluble in hot water while it is only sparingly soluble in cold water and the compound is separated from the water of its solution by cooling and refrigeration as contradistinguished to and from the heating, boiling, and evaporation of the large amount of water which constitutes the major portion of the solution as practised in the prior art.

The residue obtained in the present process contains substantially all the aluminium silicate which existed in the original feldspar or mineral treated associated with silica left by the potassium or other alkali metal separated and free from iron and similar contamination, which results in an educt of commercial value superior to the initial or primary substance, viz: feldspar, employed as a source which does not result as either a product or educt in the processes of the prior art.

It will also be noted in the present process that in the neutral or alkaline silicofluorid employed as a medium of transformation the base may be either fixed or volatile and of metal or non-metal character such as aluminium, sodium, or ammonium, as illustrated in the examples set forth.

Having now described my invention what I claim is:

1. The process of converting substantially water insoluble alkali metal containing silicates into successively more and more water soluble alkali metal compounds, which comprises exposing such insoluble compound to the action of a non-acid silicofluorid, separating the resultant soluble product therefrom and exposing it to the action of a chemical reagent capable of regenerating a compound similar to that originally employed as the transforming agent and producing a still more soluble alkali metal compound.

2. The process of converting substantially water insoluble aluminium and alkali metal containing silicates into successively more and more water soluble alkali metal compounds, which comprises exposing such insoluble compound to the action of a non-acid silicofluorid, separating the resultant soluble product therefrom and exposing it to the action of a chemical reagent capable of regenerating a compound similar to that originally employed as the transforming agent and producing a still more soluble alkali metal compound.

3. The process of converting substantially water insoluble potassium containing silicate into successively more and more water soluble potassium compounds, which comprises exposing such insoluble potassium-containing compound to the action of a non-acid silicofluorid, separating the resultant soluble product therefrom, and exposing it to the action of a chemical reagent capable of regenerating a compound similar to that originally employed as the transforming agent and producing a still more soluble potassium compound.

4. The process of converting substantially water insoluble aluminium and potassium containing silicates into successively more and more water soluble potassium compounds, which comprises exposing such insoluble compound to the action of a non-acid silicofluorid, separating the resultant soluble product therefrom and exposing it to the action of a chemical reagent capable of regenerating a compound similar to that originally employed as the transforming agent and producing a still more soluble potassium compound.

5. The process of converting feldspar into successively more and more water soluble alkali metal compounds, which comprises exposing such feldspar to the action of a non-acid silicofluorid, separating the resultant soluble product therefrom and exposing it to the action of a chemical reagent capable of regenerating a compound similar to that originally employed as the transforming agent and producing a still more soluble alkali metal compound.

6. The process of converting orthoclase into successively more and more water soluble potassium compounds, which comprises exposing such orthoclase to the action of a non-acid silicofluorid, separating the resultant soluble product therefrom and exposing it to the action of a chemical reagent capable of regenerating a compound similar to that originally employed as the transforming agent and producing a still more soluble potassium compound.

7. The process of converting substantially water insoluble alkali metal containing silicates into alkali metal carbonate, which comprises exposing such insoluble compound to the action of ammonium silicofluorid, water, and heat, separating the resultant solution therefrom, cooling the same, removing the water from the precipitate and exposing it to the action of ammonium carbonate produced by the action of the ammonia evolved in the first step and carbon dioxid on the precipitate associated with water, dissolving out the ammonium silicofluorid thus formed from the alkali metal carbonate and employing the same for the conversion of further insoluble alkali metal containing silicate in the continuance of the process.

8. The process of converting substantially water insoluble alkali metal containing silicates into alkali metal carbonate, which comprises exposing such insoluble compound to the action of ammonium silicofluorid, water, and heat, separating the resultant solution therefrom, cooling the same, removing water from the precipitate and exposing it to the action of ammonium carbonate, dissolving out the ammonium silicofluorid thus formed from the alkali metal carbonate and employing the same for the conversion of further insoluble alkali metal containing silicate in the continuance of the process.

9. The process of converting substantially insoluble alkali metal aluminium containing silicates into alkali metal carbonate and kaolin, which comprises exposing the insoluble compound to the action of ammonium silicofluorid, water, and heat, separating the resultant solution from the kaolin educt, cooling the solution, removing the water from the precipitate and exposing it to the action of ammonium carbonate, and finally separating the ammonium silicofluorid thus formed by dissolving the same in a limited amount of water.

10. The process of converting potassium containing silicates substantially insoluble in water into potassium carbonate, which comprises exposing the insoluble potassium-containing compound to the action of ammonium silicofluorid, water, and heat, separating the resultant solution therefrom, cooling the same, removing the water from the precipitate, exposing it to the action of ammonium carbonate, and dissolving out the resultant ammonium silicofluorid.

11. The process of converting substantially insoluble potassium and aluminium containing silicates into potassium carbonate and kaolin, which comprises exposing the insoluble compound to the action of ammonium silicofluorid, water, and heat, separating the resultant solution from the kaolin educt, cooling the solution, removing the water from the precipitate and exposing it to the action of ammonium carbonate, and finally separating the ammonium silicofluorid thus formed by dissolving the same in a limited amount of water.

12. In the process of converting substantially water insoluble alkali metal containing silicates, the steps which include the successive conversion of the water insoluble alkali metal compound into an alkali metal silicofluorid soluble in hot water but sparingly soluble in cold water, separating the alkali metal silicofluorid thus formed from solution by cooling, separating the water therefrom, and converting the precipitate into alkali metal carbonate by the action of ammonium carbonate, and finally recovering the alkali metal carbonate by dissolving out the ammonium silicofluorid formed.

13. The process of converting substantially water insoluble alkali metal containing silicates into successively more and more water soluble alkali metal compounds, which comprises exposing such insoluble compound to the action of an alkaline silicofluorid, separating the resultant soluble product therefrom and exposing it to the action of a chemical reagent capable of regenerating a compound similar to that originally employed as the transforming agent and producing a still more soluble alkali metal compound.

14. The process of converting substantially water insoluble aluminium and alkali metal containing silicates into successively more and more water soluble alkali metal compounds, which comprises exposing such insoluble compound to the action of an alkaline silicofluorid, separating the resultant soluble product therefrom and exposing it to the action of a chemical reagent capable of regenerating a compound similar to that originally employed as the transforming agent and producing a still more soluble alkali metal compound.

15. The process of converting substantially water insoluble potassium containing silicate into successively more and more water soluble potassium compounds, which comprises exposing such insoluble potassium-containing compound to the action of an alkaline silicofluorid, separating the resultant soluble product therefrom, and exposing it to the action of a chemical reagent capable of regenerating a compound similar to that originally employed as the transforming agent and producing a still more soluble potassium compound.

16. The process of converting substantially water insoluble aluminium and potassium containing silicates into successively more and more water soluble potassium compounds, which comprises exposing such insoluble compound to the action of an alkaline silicofluorid, separating the resultant soluble product therefrom and exposing it to the action of a chemical reagent capable of regenerating a compound similar to that originally employed as the transforming agent and producing a still more soluble potassium compound.

17. The process of converting feldspar into successively more and more water soluble alkali metal compounds, which comprises exposing such feldspar to the action of an alkaline silicofluorid, separating the resultant soluble product therefrom and exposing it to the action of a chemical reagent capable of regenerating a compound similar to that originally employed as the transforming agent and producing a still more soluble alkali metal compound.

18. The process of converting orthoclase into successively more and more water soluble potassium compounds, which comprises exposing such orthoclase to the action of an alkaline silicofluorid, separating the resultant soluble product therefrom and exposing it to the action of a chemical reagent capable of regenerating a compound similar to that originally employed as the transforming agent and producing a still more soluble potassium compound.

19. In the process of converting substantially water insoluble alkali-metal containing compounds or minerals, the combination of steps which include acting upon such water insoluble alkali-metal-containing substance with non-acid silicofluorid, with the reaction augmenting step comprising subjecting the ingredients to superatmospheric pressure during the reacting operation.

20. In the process of converting substantially water insoluble alkali-metal containing compounds or minerals, the combination of steps, which include acting upon such water insoluble alkali-metal-containing substance with ammonium silicofluorid, with the reaction augmenting step comprising subjecting the ingredients to superatmospheric pressure during the reacting operation.

21. In the process of converting substantially water insoluble potassium containing compounds or minerals, the combination of steps which include acting upon such water insoluble potassium-containing substance with non-acid silicofluorid, with the reaction augmenting step comprising subjecting the ingredients to superatmospheric pressure during the reacting operation.

22. In the process of converting substantially water insoluble potassium containing compounds or minerals, the combination of steps, which include acting upon such potassium containing substance with ammonium silicofluorid with the reaction augmenting step, comprising subjecting the ingredients to superatmospheric pressure during the reacting operation.

23. The process of converting substantially water insoluble alkali-metal containing compounds or minerals, which comprises acting upon such alkali-metal containing substance with a non-acid silicofluorid.

24. The process of converting substantially water insoluble potassium containing compounds or minerals, which comprises acting upon such potassium containing substance with a non-acid silicofluorid.

25. The process of converting substantially water insoluble alkali-metal containing compounds or minerals, which comprises acting upon such alkali-metal containing substance with ammonium silicofluorid.

26. The process of converting substantially water insoluble potassium containing compounds or minerals, which comprises acting upon such potassium containing substance with ammonium silicofluorid.

In witness whereof, I affix my signature in the presence of two witnesses.

HENRY SPENCER BLACKMORE. [L. S.]

Witnesses:
WALTER D. KEMP,
F. L. WHRITNER.